(12) United States Patent
Yang

(10) Patent No.: US 10,425,822 B2
(45) Date of Patent: Sep. 24, 2019

(54) RADIO RESOURCE REUSE METHOD, BASE STATION DEVICE, TERMINAL DEVICE AND RADIO COMMUNICATION SYSTEM

(71) Applicant: Xuezhi Yang, Beijing (CN)

(72) Inventor: Xuezhi Yang, Beijing (CN)

( * ) Notice: Subject to any disclaimer, the term of this patent is extended or adjusted under 35 U.S.C. 154(b) by 292 days.

(21) Appl. No.: 15/108,638

(22) PCT Filed: Dec. 18, 2014

(86) PCT No.: PCT/CN2014/094153
§ 371 (c)(1),
(2) Date: Jun. 28, 2016

(87) PCT Pub. No.: WO2015/096653
PCT Pub. Date: Jul. 2, 2015

(65) Prior Publication Data
US 2016/0323749 A1    Nov. 3, 2016

(30) Foreign Application Priority Data

Dec. 28, 2013  (CN) .......................... 2013 1 0735224
Mar. 8, 2014   (CN) .......................... 2014 1 0082468

(51) Int. Cl.
*H04W 4/00*    (2018.01)
*H04W 72/12*   (2009.01)
(Continued)

(52) U.S. Cl.
CPC ........... *H04W 16/02* (2013.01); *H04W 24/10* (2013.01); *H04W 52/04* (2013.01);
(Continued)

(58) Field of Classification Search
CPC ..... H04W 16/02; H04W 24/10; H04W 52/04; H04W 72/0446; H04W 72/0453;
(Continued)

(56) References Cited

U.S. PATENT DOCUMENTS 6,882,841 B1* 4/2005 Youn .................. H04W 74/006
                                              370/329
8,180,354 B2* 5/2012 Li ........................ H04L 5/0016
                                              370/280
(Continued)

FOREIGN PATENT DOCUMENTS

CN    1855907     11/2006
CN    101772176    7/2010
(Continued)

OTHER PUBLICATIONS

International Search Report for PCT/CN2014/094153, dated Mar. 27, 2015, 6 pages.

*Primary Examiner* — Edan Orgad
*Assistant Examiner* — Vanneilian Lalchinthang
(74) *Attorney, Agent, or Firm* — Nixon & Vanderhye P.C.

(57) ABSTRACT

Disclosed is a radio resource reuse method, a base station device, a terminal device, and a radio communication system. The system at least comprises two adjacent cells $C_i$ (i=1, 2), using time-frequency resource, denoted as S for communication, which is divided into at least two resource units, each of the resource units being one time-frequency resource block. The method comprises: dividing the time-frequency resource S into N non-overlapping resource groups, denoted as $RG_n$ (n=1, 2, . . . , N), N being an integer larger than 1, and each of the resource groups comprising at least two of the resource units; and dividing $RG_n$ (n=1, 2, . . . , N), in cell $C_i$ (i=1, 2), into two non-overlapping portions, of which, one portion is configured with an upper power density limit $h^{(i)}_n$ and termed a primary sub-resource group of $RG_n$, and the other portion is configured with an upper power density limit $l^{(i)}_n$ and termed a secondary sub-resource group of $RG_n$, wherein the sub-resource groups have the following relationships in terms of upper power density limit thereof: $l^{(i)}_1/h^{(i)}_1 < l^{(i)}_2/h^{(i)}_2 < \ldots < l^{(i)}_N/h^{(i)}_N \leq 1$, (Continued)

wherein the primary sub-resource groups of the two adjacent cells $C_i$ (i=1, 2) do not overlap with each other in each resource group.

16 Claims, 11 Drawing Sheets

(51) Int. Cl.
    *H04W 16/00* (2009.01)
    *H04W 16/02* (2009.01)
    *H04W 24/10* (2009.01)
    *H04W 52/04* (2009.01)
    *H04W 72/04* (2009.01)
    *H04W 16/10* (2009.01)
    *H04W 16/12* (2009.01)
    *H04W 16/30* (2009.01)
    *H04W 16/32* (2009.01)

(52) U.S. Cl.
    CPC ... *H04W 72/0446* (2013.01); *H04W 72/0453* (2013.01); *H04W 16/10* (2013.01); *H04W 16/12* (2013.01); *H04W 16/30* (2013.01); *H04W 16/32* (2013.01); *Y02D 70/1262* (2018.01)

(58) Field of Classification Search
    CPC ..... H04W 16/10; H04W 16/12; H04W 16/30; H04W 16/32; H04W 74/0833; Y02D 70/1262; H04L 5/0007; H04L 2025/03414; H04L 27/2662; H04L 27/2647; H04B 7/0456; H04B 1/04
    USPC ........................................................ 370/330
    See application file for complete search history.

(56) References Cited

U.S. PATENT DOCUMENTS

| | | | | |
|---|---|---|---|---|
| 9,894,672 | B2 * | 2/2018 | Qin | H04W 72/082 |
| 2011/0280205 | A1 | 11/2011 | Qim et al. | |
| 2011/0287805 | A1 * | 11/2011 | Kaminski | H04W 36/08 |
| | | | | 455/525 |
| 2012/0122503 | A1 * | 5/2012 | Ma | H04W 16/10 |
| | | | | 455/501 |
| 2012/0176961 | A1 * | 7/2012 | Horiuchi | H04L 5/0053 |
| | | | | 370/315 |
| 2016/0073292 | A1 * | 3/2016 | Fan | H04W 28/06 |
| | | | | 370/230 |
| 2016/0134411 | A1 * | 5/2016 | Frederiksen | H04L 5/0042 |
| | | | | 370/329 |

FOREIGN PATENT DOCUMENTS

| | | |
|---|---|---|
| CN | 101801091 | 8/2010 |
| CN | 102790739 | 11/2012 |
| CN | 103702430 | 4/2014 |
| CN | 103906247 | 7/2014 |

\* cited by examiner

RADIO RESOURCE REUSE METHOD, BASE STATION DEVICE, TERMINAL DEVICE AND RADIO COMMUNICATION SYSTEM

CROSS-REFERENCE TO RELATED APPLICATIONS

This application is the U.S. national phase of International Application No. PCT/CN2014/094153 filed Dec. 18, 2014, which designated the U.S. and claims the priority of Chinese patent application CN 201310735224.2, entitled "Multilevel soft time-frequency reuse and resource allocation method, device, and system" and filed on Dec. 28, 2013, and the priority of Chinese patent application CN 201410082468.X, entitled "Multilevel soft time-frequency reuse and resource allocation method, device, and system" and filed on Mar. 8, 2014, the contents of each of which are incorporated herein by reference.

FIELD OF THE INVENTION

The present invention relates to the field of radio communications, and in particular, to a radio resource reuse method, a base station device, a terminal device, and a radio communication system.

BACKGROUND OF THE INVENTION

When the LTE standard began, the requirement on improvement of cell edge data rate was proposed. To fulfill such a requirement, a variety of solutions have been put forward in the industry, including the well-known soft frequency reuse and fractional frequency reuse, among others. Currently, these technologies are being widely studied and applied, and have been developed into a key LTE feature as inter cell interference coordination (ICIC).

The frequency band used in fractional frequency reuse is divided into two portions, each portion using a different reuse factor. As shown in FIG. 1, the B1 (=B11+B12+B13) portion uses reuse factor 3, while the B2+B3 portion uses reuse factor 1. The curve in FIG. 1 illustrates the upper power density limit (UPDL) of a transmitter on each portion. The power density of the transmitter can be smaller than or equal to such UPDL, which, however, cannot be exceeded. This curve is also termed power density mask (PDM for short).

The B1 portion with reuse factor of 3 uses the frequency band with a relatively high UPDL, which can cover the entire cell; while the B2+B3 portion with reuse factor 1 use a relatively low UPDL, which can cover an inner region of the cell only. The coverage areas of fractional frequency reuse are illustrated in FIGS. 2 and 3, of which, FIG. 2 shows the scenario of omnidirectional cells, and FIG. 3 shows the scenario of three-sector cells. The two scenarios are similar to each other. For the sake of convenience, the omnidirectional cell and the three-sector cell are both termed cell in the present invention.

The symbols of frequency band in FIGS. 2 and 3, i.e., B11, B12, B13, B2, and B3 are placed at the inner sides of the farthest boundaries of their corresponding coverage areas. For example, B2 and B3 are placed at inner positions of the cells, which indicates coverage of only the inner cell region; while B11, B12, and B13 are placed at the edges of the cells, indicating coverage of entire cells, including, of course, inner regions of the cells, although not marked in the figures.

FIGS. 2 and 3 show regular hexagonal cells, wherein the inner region of a cell is the area inside a regular circle or ellipse. In practice, due to the complex radio environments, a cell is usually in an irregular shape, with a complex boundary between the inner region and the cell edge.

The cell edge users are subjected to relatively severe interferences. Reuse factor 3 can be used to prevent interferences from adjacent cells, thereby improving signal-to-interference-plus-noise ratio (SINR). Interferences at the cell center are relatively slight, and thus reuse factor 1 can be used to make full use of the bandwidth. Therefore, fractional frequency reuse has attracted much attention.

The fractional frequency reuse can be applied in both uplink (signals travel from a terminal to a base station) and downlink (signals travel from a base station to a terminal).

The major defects of fractional frequency reuse lie in that a cell cannot use the whole bandwidth, and even fewer bandwidth is available at the cell edge.

The soft frequency reuse scheme was disclosed in CN 1783861, entitled "Method for realizing soft frequency reuse in radio communication system," and invented by Yang Xuezhi. The power density mask thereof is shown in FIG. 4. FIGS. 5 and 6 show coverage areas of all frequency bands.

In the soft frequency reuse scheme as shown in FIG. 4, the whole bandwidth is divided into three sub-bands, referred to as B1, B2, and B3, respectively. One sub-band is selected as primary sub-band for each cell with a relatively high UPDL, which can cover the entire cell. Other sub-bands are selected as secondary sub-bands with a relatively low UPDL, which can only cover an inner region of the cell. Users at the cell edge can use the primary sub-band of the cell only, while users at the inner region can use both the primary and the secondary sub-bands.

As shown in FIG. 5 or 6, in cell 1, B1 is the primary sub-band, which has a relatively high UPDL and can cover the entire cell; while B2 and B3 are secondary sub-bands with a relatively low UPDL and can cover the inner region of the cell only. Users at the cell edge can merely use the primary sub-band B1, while users at the inner region can use both the primary sub-band B1 and the secondary sub-bands B2 and B3.

In the soft frequency reuse scheme, the primary sub-bands of adjacent cells do not overlap with each other, and users at the edges of the adjacent cells therefore do not interfere with each other. At the cell edge, although there are less bandwidth available compared to reuse 1, the SINR is improved significantly enough to compensate the loss in bandwidth. As a result, the channel capacity at cell edge is largely improved. At the inner region of the cell, the expected signals are relatively strong, while the interferences from neighboring cells are relatively weak. Therefore all bandwidth is used, leading to high spectrum efficiency. Soft frequency reuse, which overcomes the defects of fractional frequency reuse, has now been intensively studied and applied, and become the mainstream technology in the ICIC field.

It can be seen that soft frequency reuse is essentially a network planning technology, providing a framework for resource allocation in each cell, under which an optimized interference pattern is achieved, improving performances of the entire network.

Soft frequency reuse divides communication resource in the frequency dimension. In parallel, communication resource can be divided in the time dimension. Time can be divided into several time slots, each of which is configured with a UPDL. This will lead to the soft time reuse scheme. More generally, communication resource can be divided in the time-frequency plane into many time-frequency blocks, thus forming the soft time-frequency reuse scheme.

The defect of soft frequency reuse lies in that the UPDL of each cell has only two levels, which merely provides a relatively rough restriction on resource allocation in each cell. Thus, there is a still relatively large room for performance improvement.

In two adjacent cells as shown in FIG. 7, the primary sub-band and secondary sub-band of cell 1 are B1 and B2 respectively. At the edge of cell 1, there are two user terminals u11 and u12, respectively using f1 and f2, which both belong to B1, for communication. As u12 is closer to the cell edge than u11, it uses a larger transmit power. The primary sub-band and secondary sub-band of cell 2 are B2 and B1 respectively, and there are two user terminals u21 and u22 at the inner region of cell 2, using f1 and f2 for communication respectively. As u21 is closer to the cell center than u22, it uses a smaller transmit power. Situations are similar in the uplink and downlink. Thus, the interference pattern here is, u11 and u21 interfere with each other, and u12 and u22 interfere with each other.

Such an interference pattern is inferior to that shown in FIG. 8. Since u12 is closer to the cell edge than u11, it is more likely to be interfered by an adjacent cell. Therefore, in a better interference pattern, u12 is placed on the same frequency with u21, while u11 is placed on the same frequency with u22. In such a pattern, user u12 with the poorest transmission condition will be least interfered, thus achieving higher rates; while the largest interference produced by u12 is exerted on user u21 with the best transmission condition. As compared with the interference pattern in FIG. 7, the interference pattern in FIG. 8 improves the lowest rate at the cell edge at the cost of lowering the highest rate in the cell center. This can improve users' experience and reduce complaints, thereby facilitating operations.

However, the existing soft frequency reuse scheme with only two UPDLs cannot provide more accurate restriction to achieve such a superior interference pattern. This is especially true in relatively complex networks. The performance of the system thus still has a relatively large room for improvement.

SUMMARY OF THE INVENTION

In order to further optimize the interference pattern of soft frequency reuse, and improve the network performance, the present invention provides a method, a device, and a system for achieving multilevel soft time-frequency reuse and resource allocation in a radio communication system.

The radio communication system of the present invention comprises at least two adjacent cells $C_i$ (i=1, 2), which use time-frequency resource S for communication. According to the present invention, a cell refers to a geometric area, and uses all the time-frequency resource S. In an actual system, two different carrier frequencies in the same geographic area may form two logical cells, with different cell identities. According to the present invention, these two logical cells belong to the same cell, which can be either an omnidirectional cell or a sectorized cell. In the present invention, two cells are adjacent means that the two cells have overlapping coverage regions. Because different time-frequency resources are to be configured with different power densities, it is required that the radio communication system can divide the time-frequency resources S into a plurality of (e.g., at least two as will be mentioned in the detailed embodiments) resource units. Each resource unit is one time-frequency resource block for which a separate power density can be set. A technical solution of the multilevel soft time-frequency reuse according to the embodiments of the present invention is as follows.

The time-frequency resource S is divided into N non-overlapping resource groups, denoted as $RG_n$ (n=1, 2, ..., N) with N being an integer larger than 1. Each of the resource groups comprises a plurality of (e.g., at least two as will be mentioned in detailed embodiments) resource units.

In cell $C_i$ (i=1, 2), $RG_n$ (n=1, 2, ..., N) is divided into two non-overlapping portions, of which, one portion is configured with a UPDL $h^{(i)}_n$ and termed primary sub-resource-group (SRG) of $RG_n$, and the other portion is configured with a UPDL $l^{(i)}_n$ and termed secondary SRG of $RG_n$, wherein the primary SRG and the secondary SRG, termed SRG in general, have the following relationship in terms of UPDL thereof: $l^{(i)}_1/h^{(i)}_1 < l^{(i)}_2/h^{(i)}_2 < \ldots < l^{(i)}_N/h^{(i)}_N \leq 1$, and if N=2, then $l^{(i)}_2 \neq h^{(i)}_2$. Each SRG is configured with a UPDL, in such a manner that the transmit power density of a transmitter in the SRG does not exceed the UPDL of the SRG.

The primary SRGs of two adjacent cells do not overlap with each other in each resource group.

In one embodiment of the present invention, the primary SRG and the secondary SRG are termed SRG in general. The way how a time-frequency resource S is divided into resource groups and SRGs, and the UPDLs of all SRGs are termed PDM information.

As can be seen, in the multilevel soft time-frequency reuse scheme, a soft time-frequency reuse scheme is used on each resource group among the N resource groups. The ratio between the UPDL of the secondary SRG and the UPDL of the primary SRG in each resource group, i.e., $l^{(i)}_n/h^{(i)}_n$, increases with the index number of the resource group in each of two adjacent cells. If the partitioning of the resource groups is maintained, with only the index numbers of the resource groups being re-specified, and the ratios $l^{(i)}_n/h^{(i)}_n$ of two adjacent cells are sorted from small to large to obtain two sequences, the indexes of which will be the same.

In practice, it is reasonable that a relatively high UPDL corresponds to a relatively large coverage area, and thus typically further specifies: $l^{(i)}_1 \leq l^{(i)}_2 \leq \ldots \leq l^{(i)}_N \leq h^{(i)}_N \leq \ldots \leq h^{(i)}_2 \leq h^{(i)}_1$ (i=1, 2). Such configuration enables the pair and mutual interference between the resource with the highest/second highest UPDL in a cell and the resource with the lowest/second lowest UPDL in its adjacent cell, thereby achieving an optimized interference pattern. In an interference-limited scenario, i.e., interference is much higher than noise, communication quality will not be influenced if the power density of a certain resource is amplified by a same factor in all cells, i.e., user signal and interference are increased by the same factor. Therefore, based on the relationship $l^{(i)}_1 \leq l^{(i)}_2 \leq \ldots \leq l^{(i)}_N \leq h^{(i)}_N \leq \ldots \leq h^{(i)}_2 \leq h^{(i)}_1$ (i=1, 2), $l^{(i)}n/h^{(i)}_n$ will keep unchanged if $l^{(i)}_n$ and $h^{(i)}_n$ (i=1, 2) are both multiplied by a same factor, and so does the communication quality. The order of UPDLs, however, might be destroyed, and an SRG with a higher UPDL might unexpectedly cover a smaller area, thus causing the waste of power.

It can be further specified that $l^{(i)}_1 < a^{(i)} < b^{(i)} < h^{(i)}_1$ (i=1, 2), wherein $a^{(i)}$ and $b^{(i)}$ refer to any two different UPDLs among $h^{(i)}_n$ (n=2, 3, ..., N) and $l^{(i)}_n$ (n=2, 3, ..., N). That is, at least four different values of UPDL are configured.

There are only two UPDLs in the soft frequency reuse scheme, and a cell is accordingly divided into two regions, a cell edge and a cell center. In the multilevel soft time-frequency reuse scheme, however, if N=2, the cell edge will be further divided into two regions, which may be termed a farthermost edge and a second farthermost edge. Besides, the cell center will also be divided into two regions, which may be termed a most central region and a sub-central region. A terminal at the farthermost edge of a cell will be allocated a resource with the highest UPDL, and such a resource has the lowest UPDL in the adjacent cell, and thus can be allocated to a terminal at the most central region of the adjacent cell. As can be seen from the above discussion, this is a superior interference pattern, which can prevent the mutual interference between the farthermost region and the sub-central region, thereby improving the performance of the system.

Such an analysis further indicates that the larger number N of resource groups, and the more levels of UPDL can provide more accurate constraints and achieve better interference pattern.

The multilevel soft time-frequency reuse scheme can be used in both uplink and downlink.

The base station of the present invention, which refers to a system device or function for formation and control of a cell, can be either a device node, or distributed among a plurality of device nodes.

The base station can modify the PDM parameter of a cell if necessary.

When the scheme is used in uplink, the base station broadcasts the PDM information in the cell. In uplink, a user terminal needs the PDM information to control transmit power density. Therefore, it is necessary for the base station to transmit the PDM information to the user terminal. The semi-static PDM information can be regarded as parameter of a cell, and it would be appropriate to transmit the PDM information as system information through a broadcast channel.

Similar to soft frequency reuse, the PDM determined by the multilevel soft time-frequency reuse scheme provides a framework for resource allocation in each cell. In resource allocation in each cell, each SRG is specified with a coverage area (in other words, a separate coverage area is specified for each SRG), and the SRG with a higher UPDL is configured with a larger coverage area.

The base station continuously transmits a reference signal with a constant power, which is received by the user terminal. The received power is denoted as RSRP. An RSRP threshold is determined for each SRG, in such a manner that the SRG with a higher UPDL is configured with a smaller RSRP threshold, while the SRG with a lower UPDL is configured with a larger RSRP threshold.

The user terminal measures the RSRP, and reports it to the base station. An RSRP offset is configured for each terminal, and is used to modify the RSRP reported by the terminal, to obtain a modified RSRP for the user terminal. The base station compares the modified RSRP with the RSRP threshold of each SRG. The SRG with an RSRP threshold smaller than or equal to the modified RSRP of the user terminal is the one covering said user terminal. So a list of SRGs covering the user terminal can be established. More specifically, if the modified RSRP of the user terminal is equal to or larger than the RSRP threshold of an SRG, then the user terminal is judged to be within the coverage area of the SRG. The modified RSRP is compared with the RSRP thresholds of all SRGs, so as to establish a list of SRGs covering the user terminal.

The RSRP offset is a parameter of a user terminal, and will be reported to the base station when the terminal gets access to a cell. The base station can modify the RSRP offset of the user terminal.

The base station sorts all the SRGs in the order of the RSRP thresholds thereof. The SRGs with their RSRP thresholds smaller than or equal to the modified RSRP of the user terminal will be added into the list of SRGs covering the terminal. When such a sorting procedure is employed, the list of SRGs covering the user terminal can be quickly established.

In a mobile communication system, the user terminal may be in movement, such that the SRGs covering it will change. Therefore, the user terminal can measure the RSRP periodically, and report the measured results to the base station. The base station can thus update the list of SRGs covering the user terminal according to the RSRP measurement reports.

A user terminal can use the SRG that covers the user terminal, i.e., the SRG in the list of SRGs covering the user terminal, and will not use any SRG that is not in the list of SRGs covering the user terminal.

A user of the present invention refers to a data channel between the terminal and the base station at the application level. The data channel can be either uplink or downlink, e.g., a logical channel in the 3GPP medium access control (MAC) protocol.

The present invention further discloses a resource allocation method based on the multilevel soft time-frequency reuse scheme, comprising the steps of: establishing, for each user terminal participating in resource allocation, a list of SRGs covering the user terminal; allocating resources, for each user in data transmission, first in the SRG that covers the user terminal and has the smallest coverage area; if resources are insufficient in the SRG with the smallest coverage area, allocating resources in the SRG with the second smallest coverage area, and so on; and repeating, if the user acquires the required resources, the above steps for the next user, until all users acquire the required resources, or no resources are available.

From a functional perspective only, resources can be allocated to one user in any SRG covering the user terminal. In terms of performance of the system, however, if an SRG with a large coverage area is prematurely allocated to a cell center user, no resources might be left for cell edge users, while SRG with small coverage area might be in spare. Therefore, the SRG with smallest coverage area will be first allocated, enabling efficient utilization of resources, especially in heavy-loaded network.

According to the present invention, the result of resource allocation is termed resource allocation information.

The resource allocation method based on the multilevel soft time-frequency reuse scheme can be used in both uplink and downlink. When the method is used in downlink, resource allocation and data transmission are both performed at the base station, and the resource allocation information can be directly used by the transmitter. When the method is used in uplink, the resource allocation is performed at the base station, while the transmitter is at the user terminal. Therefore, the base station will transmit the resource allocation information to the user terminal, so as to enable the user terminal to transmit user data on the allocated resources.

The power density mask can be further configured to let at least two primary SRGs in at least one cell of $C_1$ and $C_2$ have consecutive index numbers, which are used to identify the resources during resource allocation. In this way, when a user needs to be allocated resources in these two primary SRGs, the resources can be conveniently identified. Particularly, if the index numbers of all the primary SRGs are consecutive, the consecutiveness of the index numbers of secondary SRGs will also be favorable, thereby rendering it more convenient to identify the resources.

The present invention further discloses a base station device, termed BS0, which can realize multilevel soft time-frequency reuse scheme in a radio communication system. BS0 comprises the following modules:

a transmitter module: continuously transmitting a reference signal with a constant power;

a receiver module: receiving RSRP and RSRP offset transmitted by a user terminal, and transmitting them to a terminal coverage SRG list generation module;

a PDM configuration module: dividing time-frequency resource S into N non-overlapping resource groups, denoted as $RG_n$ (n=1, 2, . . . , N), N being an integer larger than 1, and each of the resource groups including at least two resource units; dividing $RG_n$ (n=1, 2, . . . , N) into two non-overlapping portions, of which, one portion is configured with a UPDL $h_n$ and termed primary SRG of $RG_n$, and the other portion is configured with a UPDL $l_n$ and termed secondary SRG of $RG_n$, wherein the SRGs have the following relationships in terms of UPDL thereof: $l(i)_1/h(i)_1 < l(i)_2/h(i)_2 < \ldots < l(i)_N/h(i)_N \leq 1$, and $l(i)_1 \leq l(i)_2 \leq \ldots \leq l(i)_N \leq h(i)_N \leq \ldots \leq h(i)_2 \leq h(i)_1$, and if N=2, then $l^{(i)}_2 \neq h^{(i)}_2$; and transmitting PDM information to a coverage threshold generation module and the transmitter module;

the coverage threshold generation module: determining one RSRP threshold for each SRG, in such a manner that the SRG with a higher UPDL is configured with a smaller RSRP threshold, while the SRG having a lower UPDL is configured with a larger RSRP threshold; and transmitting RSRP threshold information to the terminal coverage SRG list generation module; and the terminal coverage SRG list generation module: modifying the RSRP transmitted by each user terminal according to the RSRP offset transmitted by the user terminal, so as to obtain a modified RSRP; comparing the modified RSRP of the user terminal with the RSRP threshold of each of the SRGs; and determining the SRGs with RSRP thresholds smaller than or equal to the modified RSRP of the user terminal to be the SRGs covering said user terminal, so as to establish a list of SRGs covering the user terminal.

The base station device BS0, while being used in downlink, is termed BS1. As shown in FIG. 9, BS1 can further comprise the following module:

a resource allocation module: first allocating resources, for a user in data transmission, in the SRG which covers the user terminal and has the smallest coverage area, and if resources are insufficient in the SRG with the smallest coverage area, allocating resources in the SRG which covers the user terminal and has the second smallest coverage area, and so on; repeating, if said user acquires required resources, the above step for the next user, until all users acquire required resources, or no resources are available; and transmitting the resource allocation information to the transmitter module, under which circumstance, the aforementioned transmitter module is further used for: scheduling resources for user according to the resource allocation information, transmitting user data, and controlling the transmission power density of a transmitter on each SRG, so as to enable it not to exceed the UPDL of the SRG.

The base station BS0, while being used in uplink, is termed BS2. As shown in FIG. 10, BS2 further comprises the following modules:

a terminal coverage SRG list generation module: transmitting, for a user terminal, the list of SRGs covering the user terminal to a resource allocation module; and the resource allocation module: first allocating resources, for a user in data transmission, in the SRG which covers the user terminal and has the smallest coverage area, and if resources are insufficient in the SRG with the smallest coverage area, allocating resources in the SRG which covers the terminal and has the second smallest coverage area, so on and so forth; and repeating, if said user acquires required resources, the above step for a next user, until all users acquire required resources, or until no resources are available; and transmitting the resource allocation information to the transmitter module, wherein the transmitter module is further used for: broadcasting PDM information in a cell, and transmitting the resource allocation information determined by the resource allocation module to the user terminal.

The present invention still further discloses a terminal device that achieves multilevel soft time-frequency reuse in a radio communication system. As illustrated in FIG. 11, the terminal device comprises the following modules with respective functions:

a receiver module, which receives a reference signal transmitted by a base station, transmits the reference signal to a measurement module, receives resource allocation information and PDM information broadcasted by the base station, and transmits the PDM information and the resource allocation information to a transmitter module;

the measurement module, which measures RSRP, and generates an RSRP measurement report comprising the measured RSRP, and transmits the RSRP measurement report to a transmitter module; and the transmitter module, which transmits the RSRP measurement report and RSRP offset to the base station, schedules resources for user data according to the resource allocation information, transmits user data, and control the transmission power density of a transmitter on each SRG, so as to enable it not to exceed the UPDL of the SRG.

The present invention further discloses a radio communication system that realizes multilevel soft time-frequency reuse scheme, comprising at least two base station devices (BS0, BS1, or BS2) according to the technical solution as explained above that form two adjacent cells, wherein the primary SRGs of the two adjacent cells do not overlap with each other in each resource group. The multilevel soft time-frequency reuse scheme as provided in the present invention can thus be realized.

BRIEF DESCRIPTION OF THE DRAWINGS

The accompanying drawings are provided for further understanding of the present invention, and constitute one part of the description. They serve to explain the present invention in conjunction with the embodiments, rather than to limit the present invention in any manner. In the drawings.

DETAILED DESCRIPTION OF THE EMBODIMENTS

The present invention is described in detail in conjunction with the accompanying drawings to explain the purpose, technical solutions, and advantages of the present invention more explicitly.

Time and frequency are resources of radio communication. The time-frequency resource used in the present invention is denoted as S. Typically, S can be a time-frequency plane B×T, wherein B is the frequency bandwidth, and can be either a continuous frequency band, or several discontinuous segments of spectrum; while T is a period of time, generally continuous. Under rather rare conditions, T can be discontinuous as well.

In most radio communication systems, the time resource is divided into equally long time periods (termed frame) for communication. For example, the frame length of the LTE system is 10 ms, and one frame can be further divided into 10 sub-frames, each of which lasts for 1 ms. Thus, in the time dimension, a sub-frame can be regarded as the granularity for resource partition. In the frequency dimension, each carrier has a certain bandwidth. For example, WCDMA system has a carrier bandwidth of 5 MHz, and LTE system has 6 carrier bandwidths including 1.4 MHz, 3 MHz, 5 MHz, 10 MHz, 15 MHz, and 20 MHz. Therefore, a carrier can be regarded as the granularity for resource partition.

In OFDM based radio communication system, one carrier can be divided into even smaller sub-carriers in the frequency dimension. For example, the width of a sub-carrier of the LTE system is 15 kHz. In order to prevent fragmentation of resources, the basic unit for resource allocation in LTE system is 12 sub-carriers, i.e., 180 kHz, such that 180 kHz can be regarded as the granularity for resource partition in the frequency dimension.

One resource unit can be selected as one partition granularity in the frequency dimension×partition granularity in the time dimension, the UPDL of which can be in dependently configured.

Typically, S is a time-frequency plane B×T. Under some circumstances, however, a portion of the time-frequency plane B×T will be used for some special purposes. In the LTE system, for example, a portion of the time-frequency resources are used as common reference signals (CRS). In this case, S can be a part of the time-frequency plane B×T. In the example of the LTE system, S may be the remaining part of the time-frequency plane apart from the resources occupied by the CRS.

Figure 1:
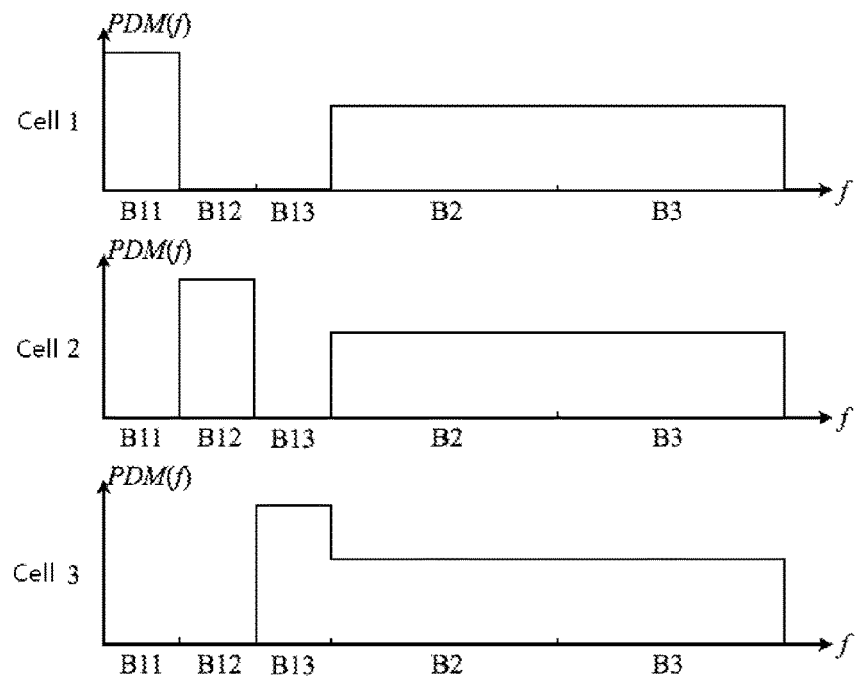
FIG. 1 shows power density mask of fractional frequency reuse.
Figure 2:
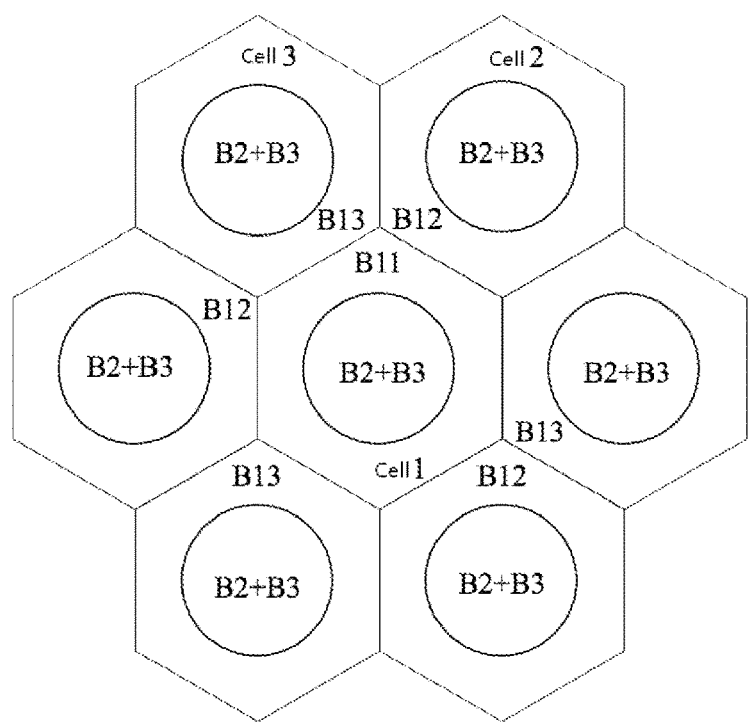
FIG. 2 shows coverage areas of frequency bands in fractional frequency reuse in the scenario of omnidirectional cells.
Figure 3:
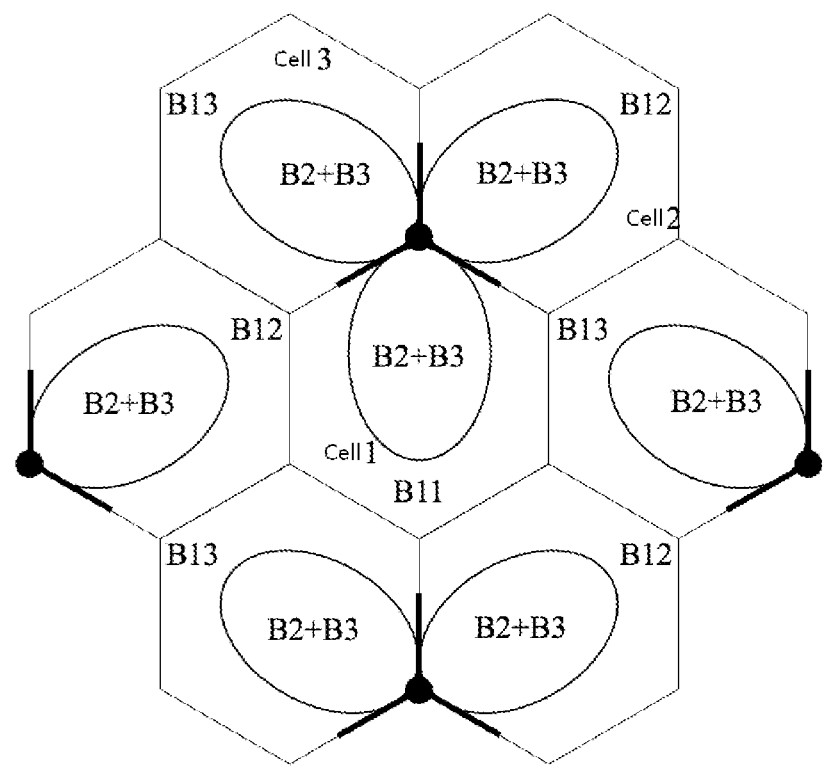
FIG. 3 shows coverage areas of frequency bands in fractional frequency reuse in the scenario of three-sector cells.
Figure 4:
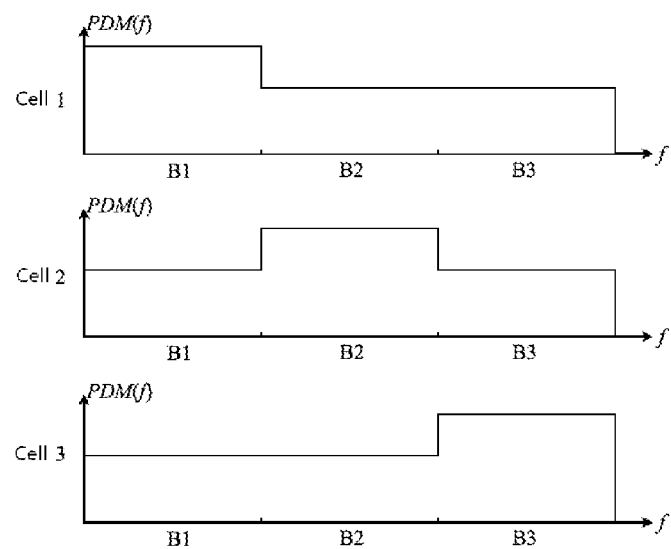
FIG. 4 shows power density mask of soft frequency reuse.
Figure 5:
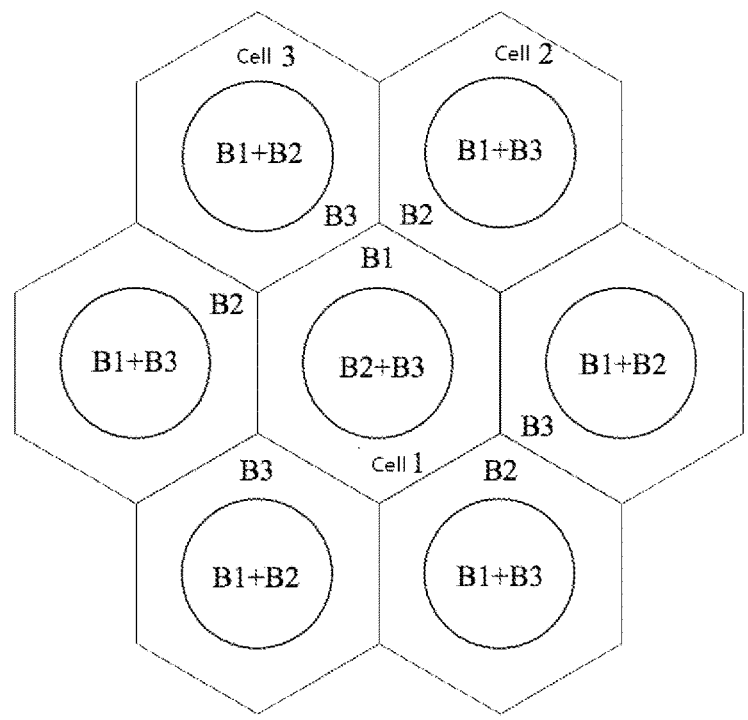
FIG. 5 shows coverage areas of frequency bands in soft frequency reuse in the scenario of omnidirectional cells.
Figure 6:
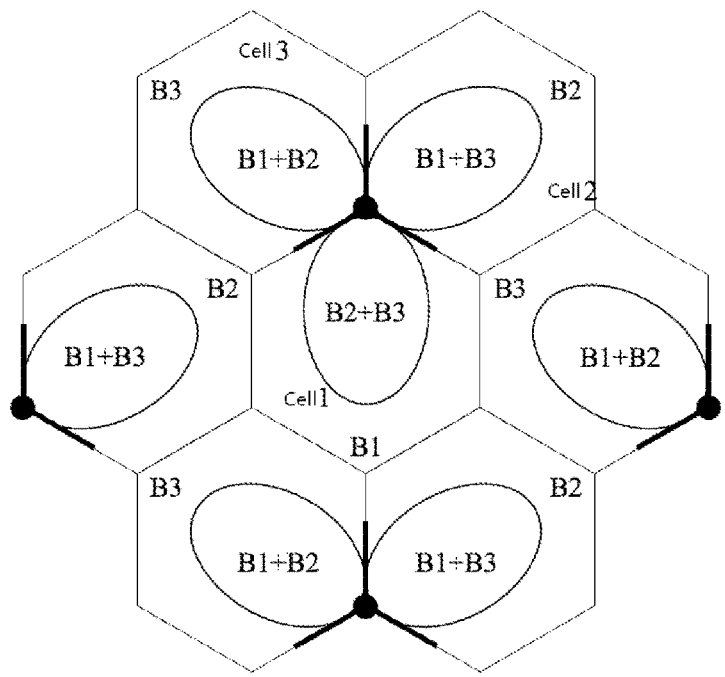
FIG. 6 shows coverage areas of frequency bands in soft frequency reuse in the scenario of three-sector cells.
Figure 7:
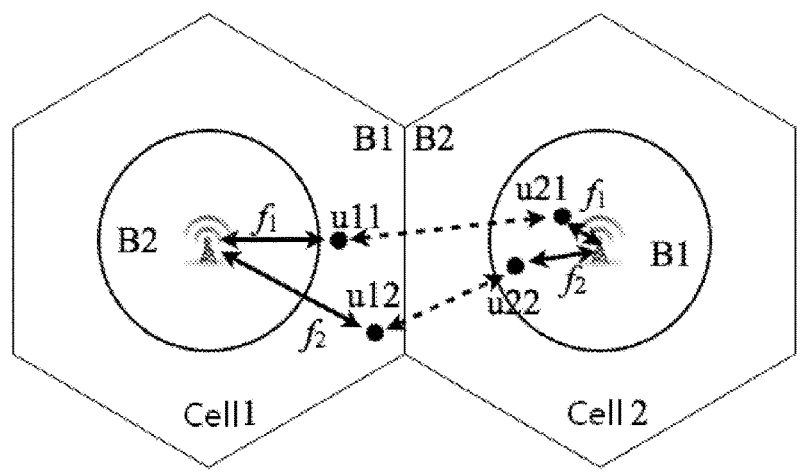
FIG. 7 shows an inferior interference pattern in soft frequency reuse.
Figure 8:
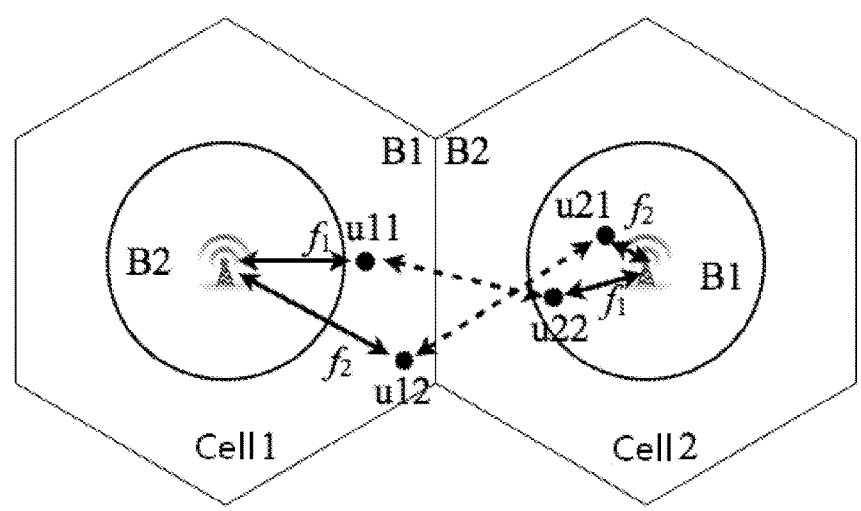
FIG. 8 shows a superior interference pattern in soft frequency reuse.
Figure 9:
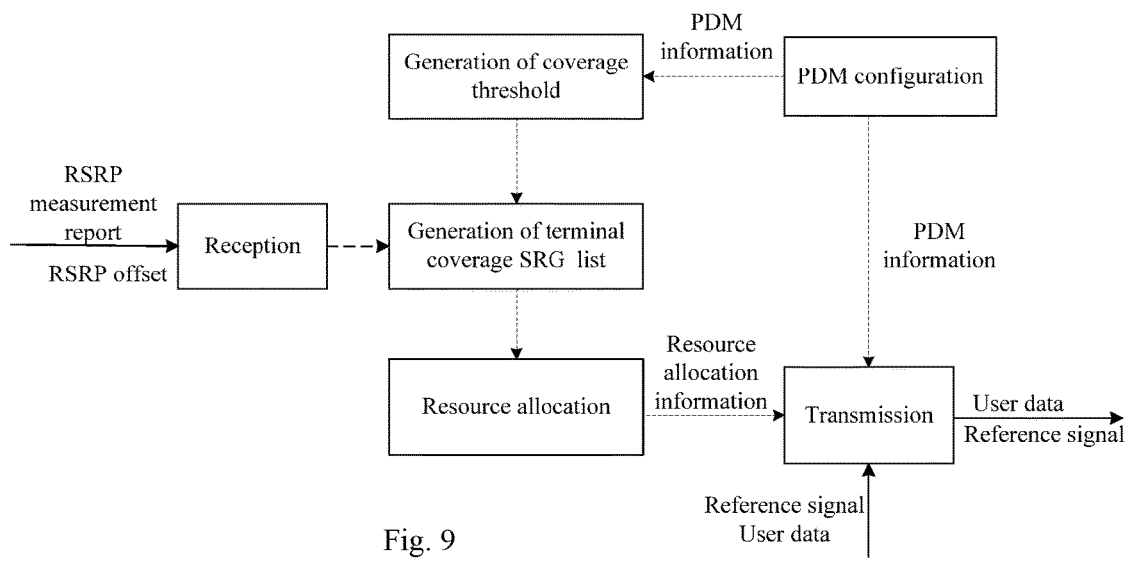
FIG. 9 shows a schematic diagram of a base station device that realizes multilevel soft time-frequency reuse in downlink.
Figure 10:
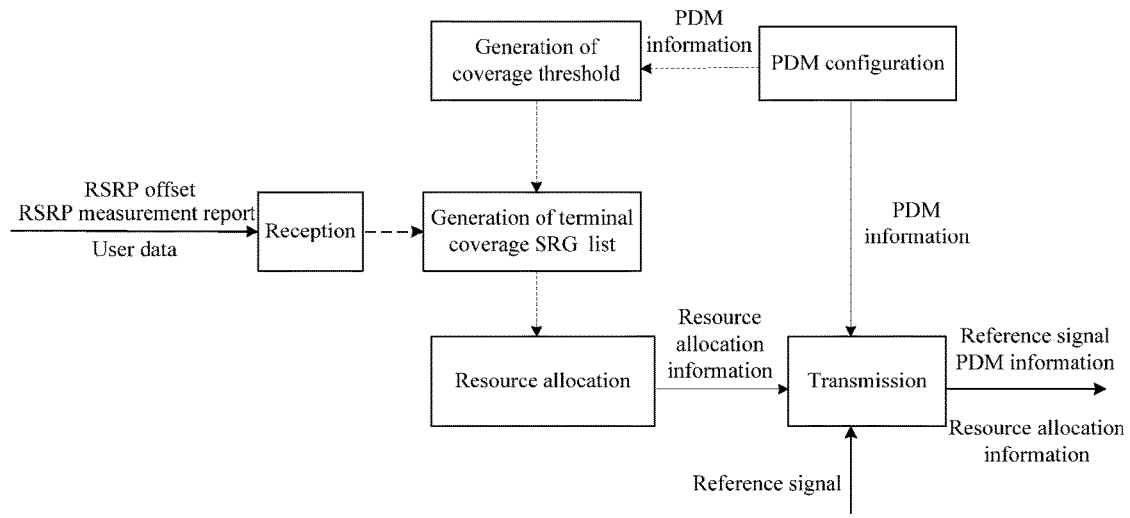
FIG. 10 shows a schematic diagram of a base station device that realizes multilevel soft time-frequency reuse in uplink.
Figure 11:
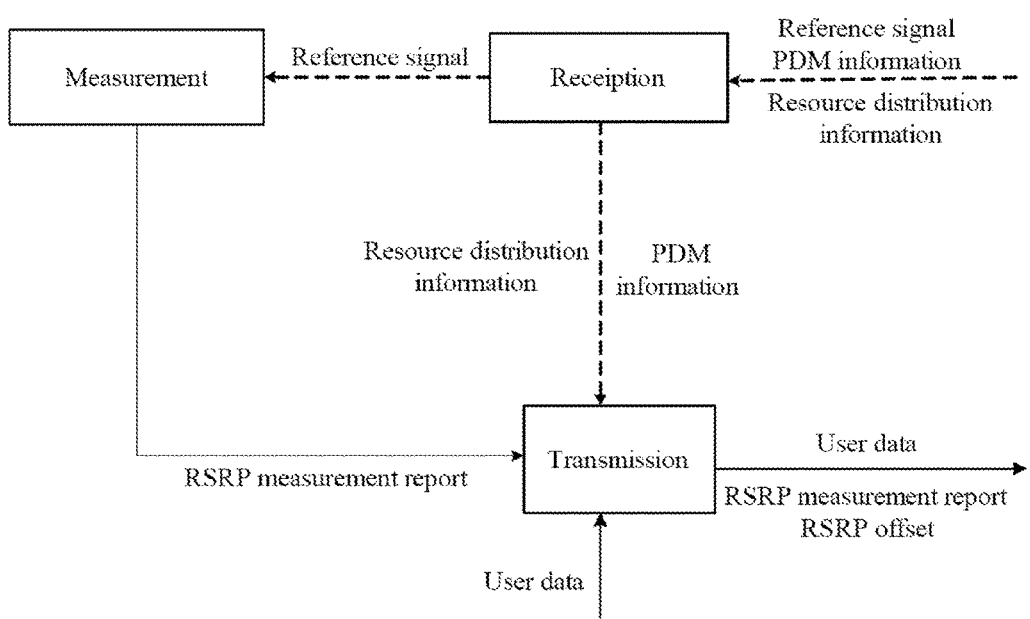
FIG. 11 shows a schematic diagram of a terminal device that realizes multilevel soft time-frequency reuse in a radio communication system.
Figure 12A:
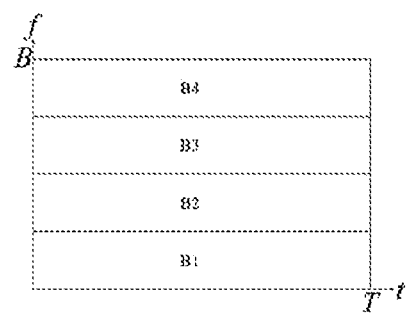
FIG. 12A shows a time-frequency plane divided into four groups of resource units in the frequency dimension.
Figure 12B:
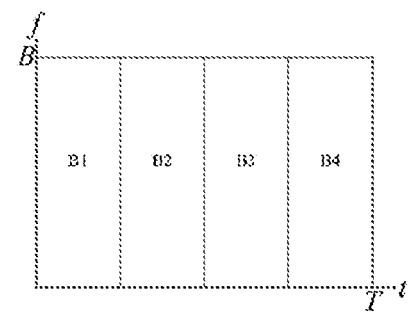
FIG. 12B shows the time-frequency plane divided into four groups of resource units in the time dimension.
Figure 12C:
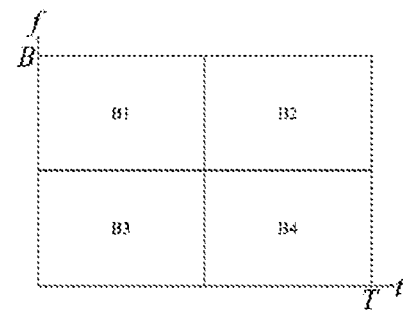
FIG. 12C shows the time-frequency plane divided into four groups of resource units in time and frequency dimensions.

Time-frequency resource S can be divided in different manners. As illustrated in FIGS. 12A, 12B, and 12C, the time-frequency plane B×T is divided into four groups of resource units B1, B2, B3, and B4 in the frequency dimension, time dimension, time-frequency dimensions, respectively, wherein each resource group can comprise one or more resource units.

Each of the four groups of resource units B1, B2, B3, and B4 can be either a block of continuous resources or several blocks of discontinuous time-frequency resources.

Figure 13:
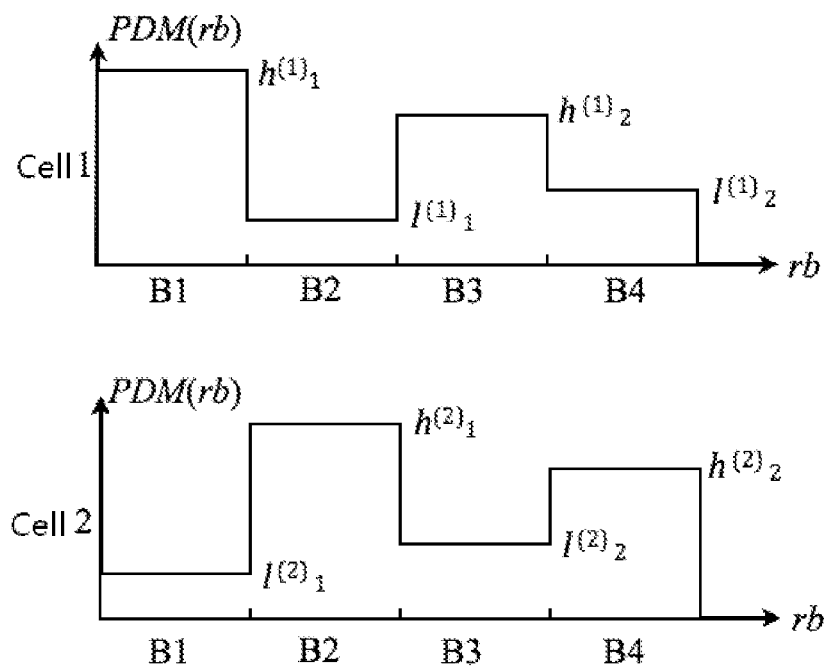
FIG. 13 shows power density mask of multilevel soft time-frequency reuse in the scenario of two resource groups and two adjacent cells.
Figure 14:
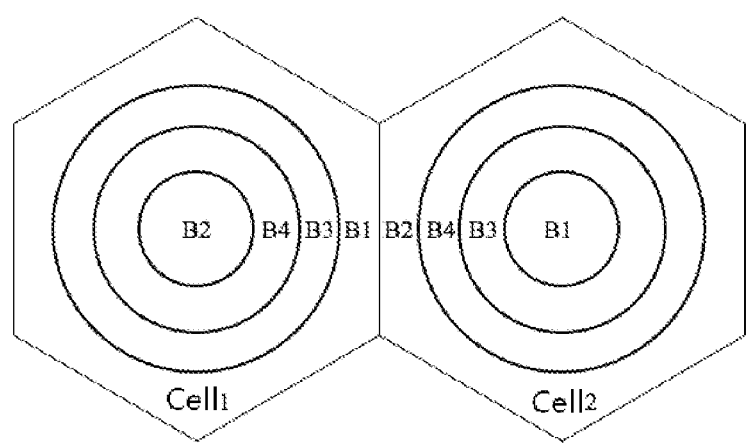
FIG. 14 shows coverage areas of SRGs in multilevel soft time-frequency reuse in the scenario of two resource groups and two adjacent cells.

According to one embodiment of multilevel soft time-frequency reuse, the time-frequency plane B×T is divided into two resource groups, wherein a first resource group comprises B1 and B2, and a second resource group comprises B3 and B4. In cell 1, B1 and B3 are the primary SRGs, and B2 and B4 are the secondary SRGs. In cell 2, B2 and B4 are the primary SRGs, and B1 and B3 are the secondary SRGs. In the two cells, the SRGs are generally configured to have different coverage areas, with different UPDLs satisfying the following relationships: $l^{(i)}_1 < l^{(i)}_2 < h^{(i)}_2 < h^{(i)}_1$, (i=1, 2). With $h^{(i)}_1$ taken as the reference, relative gains of the UPDLs can be selected as −12 dB, −8 dB, −4 dB, and 0 dB, respectively, and the value of $h^{(i)}_1$ can be selected according to cell coverage, to be 45 dBm/20 MHz, for instance. FIG. 13 shows power density mask of such an embodiment, and FIG. 14 shows coverage areas of the SRGs in a scenario of two adjacent cells. Under some special occasions, equality can be taken, for example, $l^{(i)}_1 < l^{(i)}_2 < h^{(i)}_2 = h^{(i)}_1$, or $l^{(i)}_1 = l^{(i)}_2 < h^{(i)}_2 < h^{(i)}_1$. If $l^{(i)}_1 < l^{(i)}_2 = h^{(i)}_2 < h^{(i)}_1$, (i=1, 2), and then the solution will be fractional frequency reuse ($l^{(i)}_1 = 0$) or the combination of soft frequency reuse and reuse 1 ($l^{(i)}_1 \neq 0$).

The time-frequency plane B×T can be divided into resource groups in other way. For example, the first resource group can comprise B1 and B3, while the second resource group comprises B2 and B4. In cell 1, B1 and B2 may be selected as the primary SRGs, and B3 and B4 may be selected as the secondary SRGs; while in cell 2, B3 and B4 may be selected as the primary SRGs, and B1 and B2 may be selected as the secondary SRGs. Such an embodiment may enable SRGs with similar UPDLs to be grouped together. When allocating resources in two or more SRGs with similar UPDLs for one user, continuous resources can be conveniently identified. For example, if the range of index numbers of B1 is 1-50, and the range of index numbers of B2 is 51-100, then a sign like 40-80 can identify the resources across two SRGs. If the index numbers of B1 and B2 are discontinuous, however, it will be necessary to identify the allocated resources in the two SRGs separately, which is less convenient.

The combination mode of the power density masks of the two cells can be extended in a plurality of cells along a curve, so as to form coverage in a linear region. That is, the power density masks of the two cells can be repeated in such a manner as cell 1, cell 2, cell 1, cell 2, cell 1, and cell 2.

Figure 15:
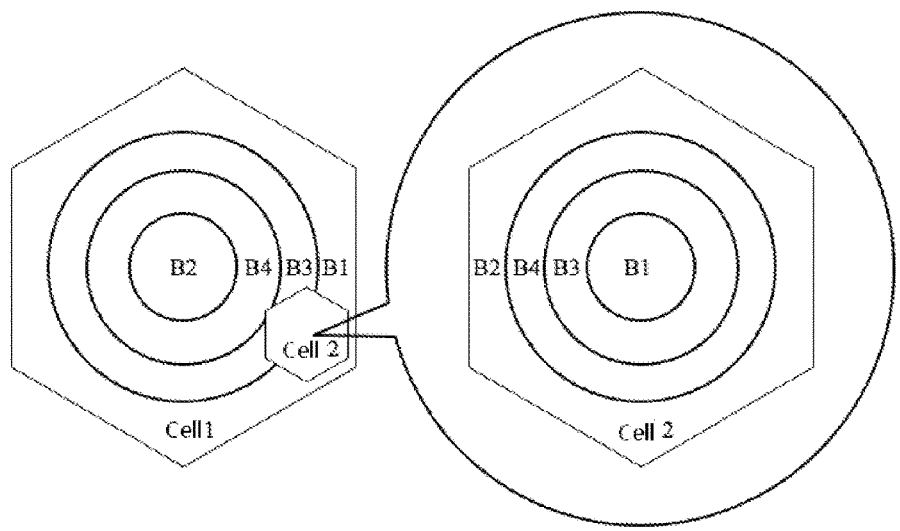
FIG. 15 shows coverage areas of SRGs in multilevel soft time-frequency reuse in the scenario of two resource groups and hierarchical cells.

The power density mask shown in FIG. 13 can be also used in a hierarchical cell structure illustrated in FIG. 15. In such a structure, cell 1 is a macro-cell used for wide coverage, while cell 2 is a microcell used to cover blind spots or hot spots. The microcell has a relatively small radius, and is completely or partially located within the coverage area of cell 1.

Figure 16:
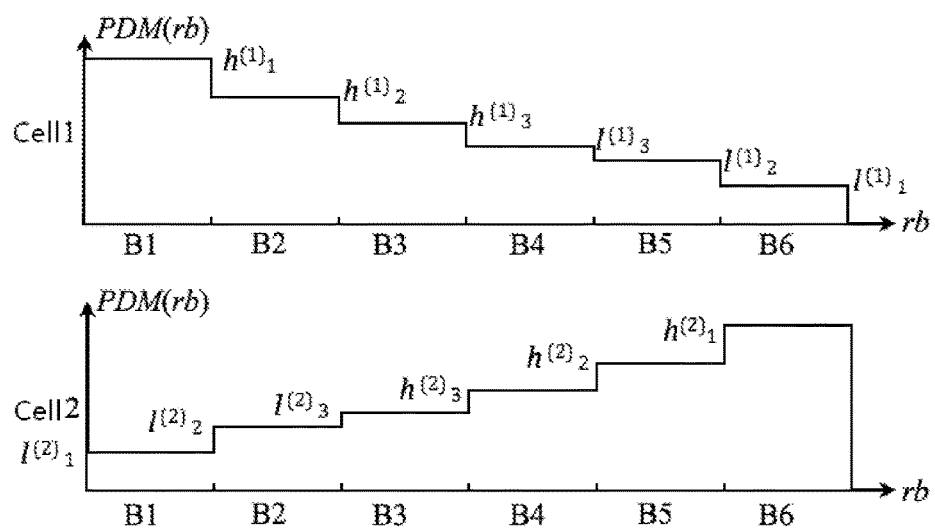
FIG. 16 shows power density mask of multilevel soft time-frequency reuse in the scenario of three resource groups and two adjacent cells.
Figure 17:
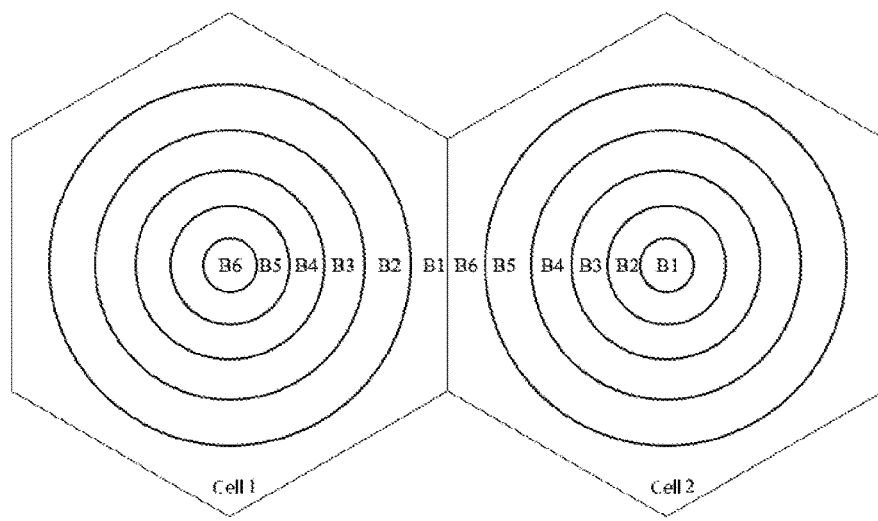
FIG. 17 shows coverage areas of SRGs in multilevel soft time-frequency reuse in the scenario of three resource groups and two adjacent cells.

The time-frequency resource S may be divided into more resource groups. For example, in the power density mask illustrated in FIG. 16, three resource groups are formed, i.e., a first resource group including B1 and B6, a second resource group including B2 and B5, and a third resource group including B3 and B4. In cell 1, B1, B2, and B3 may be selected as the primary SRGs, B6, B5, and B4 may be selected as the secondary SRGs. In cell 2, B6, B5, and B4 may be selected as the primary SRGs, B1, B2, and B3 may be selected as the secondary SRGs. In the two cells, the UPDLs satisfy the following relationships: $l^{(i)}_1 < l^{(i)}_2 < l^{(i)}_3 < h^{(i)}_3 < h^{(i)}_2 < h^{(i)}_1$, (i=1, 2). With $h^{(i)}_1$ taken as the reference, the relative gains of the UPDLs can be selected as −15 dB, −12 dB, −9 dB, −6 dB, −3 dB, and 0 dB, respectively. As can be seen, the UPDL of the SRG in the power density mask varies monotonically with the index number of resource unit. The coverage areas of the SRGs in a scenario of two adjacent cells are shown in FIG. 17.

The number of resource groups can be further increased. The more the number of resource groups, the more levels of UPDL there will be, and interference pattern will be more optimized, thereby improving performances of the system. However, an excessive amount of resource groups would lead to fragmentation of resources, which is unfavorable for resource allocation.

Figure 18:
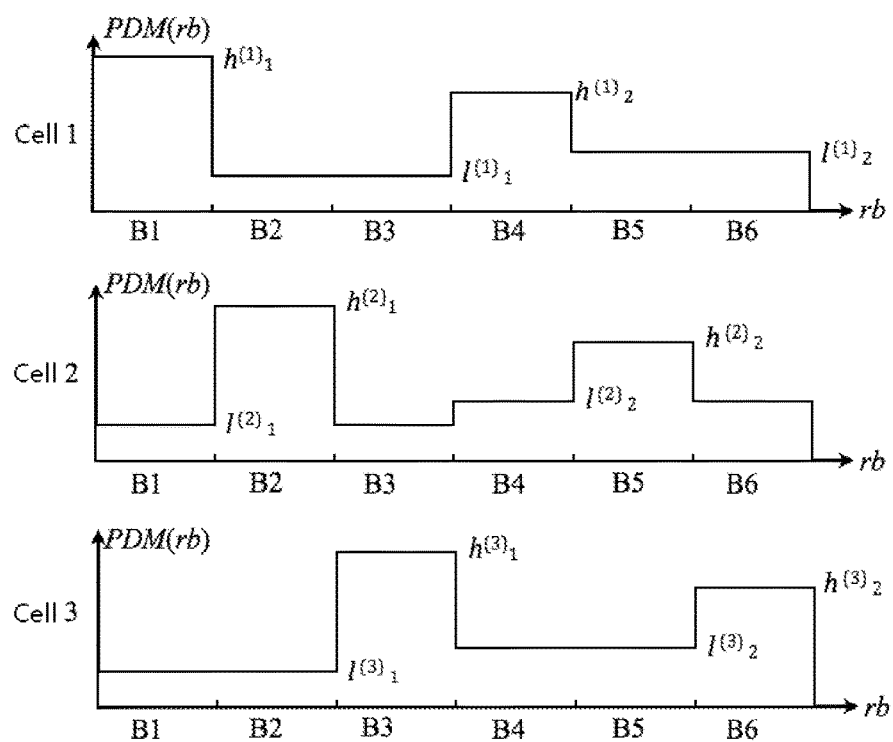
FIG. 18 shows power density mask of multilevel soft time-frequency reuse in the scenario of two resource groups and three adjacent cells.
Figure 19:
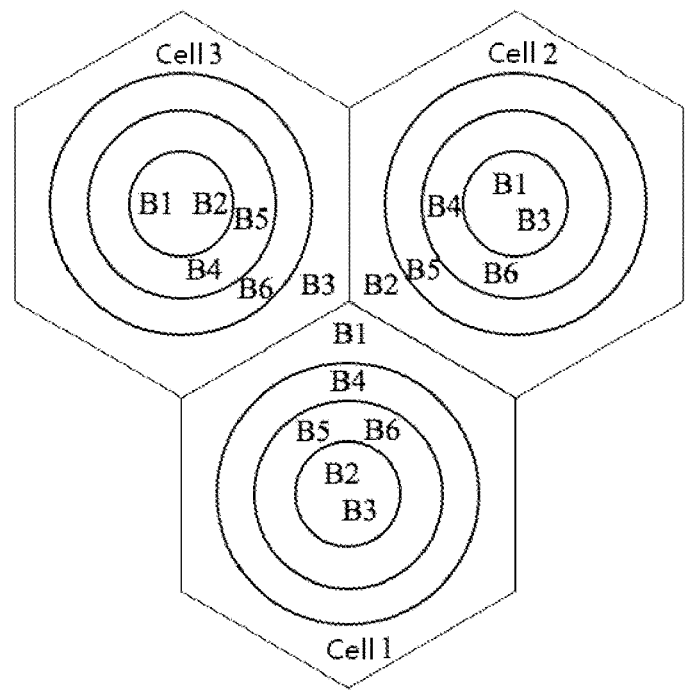
FIG. 19 shows coverage areas of SRGs in multilevel soft time-frequency reuse in the scenario of two resource groups and three adjacent omnidirectional cells.
Figure 20:
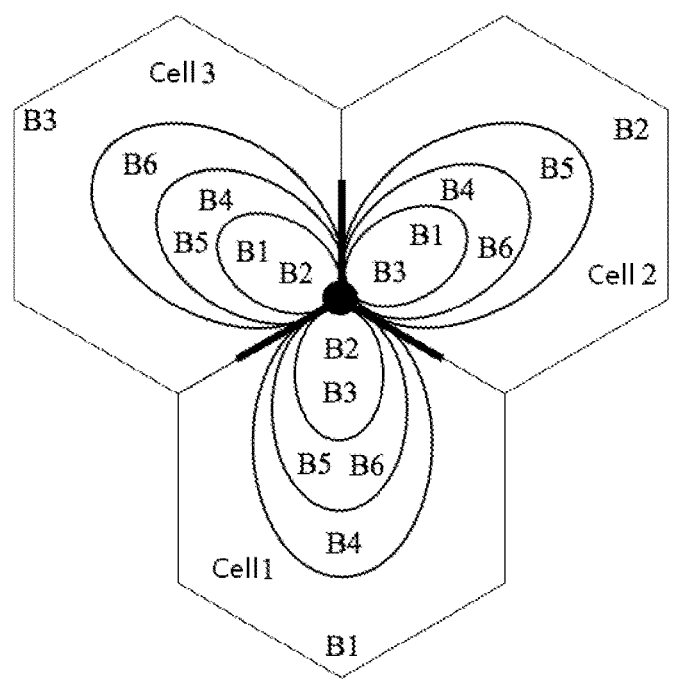
FIG. 20 shows coverage areas of SRGs in multilevel soft time-frequency reuse in the scenario of two resource groups and three adjacent sector cells.

Multilevel soft time-frequency reuse is more typically used in coverage of a plane. FIG. 18 shows power density mask of multilevel soft time-frequency reuse scheme used in three adjacent cells in a plane. The time-frequency resource S is divided into six resource units B1, B2, B3, B4, B5, and B6. These resource units constitute two resource groups, i.e., a first resource group including B1, B2, and B3, and a second resource group including B4, B5, and B6. In cell 1, B1 and B4 are primary SRGs, and others are secondary SRGs. In cell 2, B2 and B5 are primary SRGs, and others are secondary SRGs. In cell 3, B3 and B6 are primary SRGs, and others are secondary SRGs. In the three cells, the UPDLs satisfy the following relationships: $l^{(i)}_1 < l^{(i)}_2 < h^{(i)}_2 < h^{(i)}_1$, (i=1, 2, 3). FIG. 19 shows coverage areas of the SRGs in a scenario of omnidirectional cells, and FIG. 20 shows coverage areas of the SRGs in a scenario of three-sector cells.

In covering a plane, although the UPDL cannot monotonically increase or decrease along with the index number of resource unit, the primary SRGs can still be continuous, so as to facilitate identification of resources. For example, the first resource group can comprise B1, B3, and B5, and the second resource group then comprises B2, B4, and B6. In cell 1, B1 and B2 are primary SRGs, and others are secondary SRGs. In cell 2, B3 and B4 are primary SRGs, and others are secondary SRGs. In cell 3, B5 and B6 are primary SRGs, and others are secondary SRGs.

The combination mode of the power density masks of the three cells can be extended in the plane, so as to cover the entire plane.

In the present embodiment, the primary SRG accounts for ⅓ of each resource group. Other proportions, such as ¼, can also be selected for irregular cells or 3 dimensional network.

The base station can change the PDM configuration of a cell, so as to be adapted to variations in traffic distribution, radio propagation environment, etc.

Because different SRGs have different UPDLs, coverage areas thereof will be different also. Therefore, it is necessary for the base station to determine whether a user terminal is within the coverage area of an SRG, so as to determine which SRG the user terminal can use.

The base station continuously transmits a reference signal with a constant power, which can be realized in different ways. For example, in the LTE system, common reference signal (CRS) can be selected as the reference signal, and in some other systems, a broadcast channel or synchronization channel can be selected as the reference signal.

Reference signal receiving power (RSRP) of a user terminal is the received power of the reference signal at the user terminal, generally in dBm. As the reference signal has a constant transmission power, the closer the user terminal is to the cell edge, the smaller the RSRP will be. Therefore, RSRP can be regarded as a metric of the distance of the user terminal to the base station. Because the uplink is relevant with downlink in terms of large-scale fading, such an approach is applicable for both uplink and downlink, possibly with different specific numerical values though.

Each SRG is configured with an RSRP threshold, which geographically corresponds to a curve surrounding a base station antenna. The region surrounded by the curve is the coverage area of the SRG. An SRG with a relative high UPDL has a relatively large coverage area. At a far end of the coverage area, the RSRP of the user terminal will be relatively small, and thus a relatively small RSRP threshold should be configured.

As different user terminals might have different capabilities of reception or transmission, an offset, usually indicated by dB, can be additionally configured on the basis of the RSRP measured by the terminal. The RSRP of a user terminal, after being modified by the offset, is compared with the RSRP threshold of the SRG. The RSRP of a user terminal with strong capability can be increased, such that the terminal can use an SRG in a larger region; while the RSRP of a user terminal with weak capability can be reduced, such that the user terminal can use the SRG in a smaller region. If the RSRP is not modified, the offset of the RSRP is 0 dB, which is a special example.

The RSRP offset can be stored in a user terminal as a parameter, and reported to the base station when the user terminal is connected to a cell. If the user terminal fails to report the RSRP offset, the base station can configure the offset to be 0 dB by default. The base station can modify the RSRP offset of the user terminal if necessary.

For each user in communication, a list of SRGs covering the user terminal is established. Resources in the list can be allocated to the user, while resources not in the list cannot be allocated to said user. The list of SRGs can be established by comparing the modified RSRP of the terminal with the RSRP threshold of each SRG.

As the UPDL and RSRP threshold of an SRG are generally static or semi-static, the list of SRGs covering a user terminal can be established in a relatively rapid manner through a sorting procedure. For example, if there are six SRGs in a system, their RSRP thresholds can be sorted as follows in ascending order.

| | Index number of SRG | | | | | |
|---|---|---|---|---|---|---|
| | 1 | 3 | 6 | 5 | 4 | 2 |
| RSRP threshold (dBm) | −100 | −90 | −80 | −70 | −60 | −50 |

If the RSRP of a user terminal is −68 dBm, and its RSRP offset is 0 dB, all SRGs with their RSRP thresholds lower than −68 dBm in the sequence will be added into the list of SRGs covering the user terminal, i.e., SRGs 1, 3, 6, and 5.

If the user terminal is configured with an RSRP offset of −3 dB, i.e., the modified RSRP of the user terminal is −71 dBm, the list of SRGs covering the user terminal will be 1, 3, and 6. If the RSRP offset of a user terminal is 10 dB, the modified RSRP of the user terminal will be −58 dBm. The list of SRGs covering the terminal will then be 1, 3, 6, 5, and 4.

The RSRP thresholds can also be sorted in descending order.

In a mobile communication system, a user terminal may be in movement, and list of SRGs covering the user terminal may also change. A user terminal may periodically measure its RSRP, and report the results to the base station. The base station will, according to the RSRP measurement report from the user terminal, update the list of SRGs covering the user terminal. The period at which the terminal reports RSRP depends. For example, if the user terminal moves at a fast speed, a relatively short report period will be adopted; while if the user terminal moves relatively slowly, the report period will then be relatively long.

The general principle for resource allocation is, a user can use the SRGs that cover the user terminal, but cannot use the SRGs that do not cover the user terminal. The following approach can be used for better performance, especially in heavy loaded network.

For each user participating in resource allocation, a list of SRGs covering the user terminal is established. For a user in data transmission, resources are first allocated in an SRG that covers the user terminal and has the smallest coverage area. If the resources are insufficient, resources will then be allocated in the SRG having the second smallest coverage area, so on and so forth. When the user acquires necessary resources, the above steps will be repeatedly performed on a next user, until all users acquire necessary resources, or no resources are available for allocation.

From a functional perspective only, resources can be allocated for one user in any SRG covering the user terminal. In terms of performance of the system, however, if an SRG with a large coverage area is prematurely allocated to a cell center user, no resources might be available for cell edge users, while SRGs with small coverage areas might be unused. Therefore, the SRGs with small coverage areas will be first allocated, thereby enabling efficient use of resources.

It should be noted that, resource allocated to a user is not limited to time and frequency. It could be other resource such as a code in CDMA system.

The resource allocation approach based on multilevel soft time-frequency reuse can be used in both uplink and downlink. When the approach is used in uplink, resource allocation is performed at the base station, while the transmitter is at the user terminal. Therefore, the base station will transmit resource allocation information to the user terminal, such that the user terminal can transmit user data on the allocated resources. In downlink, as resource allocation and data transmission are both performed at the base station, the resource allocation information can be directly used by the transmitter. However, it is still necessary for the base station to transmit the resource allocation information to the user terminal, so as to enable the user to receive data on the allocated resources.

Resource allocation can be realized in different ways. If the communication system has a plurality of carriers, each of which is regarded as an SRG and form a logical cell. Under such circumstances, selection of one SRG means selection of one logical cell, which can be realized by a cell selection and reselection procedure, and then resources can be requested in the resided cell. In a broadband OFDM system, such as the LTE system, multiple users share one channel, which can be divided into a plurality of SRGs. Resource allocation can be realized through a scheduling procedure.

It is necessary for the transmitter to know the PDM information to control the actual transmission power density on each SRG below the configured UPDL. In downlink, the PDM is configured by the base station, and the transmitter can be directly informed of such information. In uplink, the PDM information is configured by the base station also, and the user terminals should be informed of such information somehow. It is proper to regard the PDM information as the configuration parameter of a cell, and broadcast it as system information to be received by all terminals in the cell. Such system information can be packaged into RRC system information in the 3GPP protocol.

For example, the following data structure can be used to indicate PDM information, comprising the following fields:
  Field 1: number of SRGs;
  Field 2: index range of each SRG, wherein continuous resources can be expressed with start/end, and discontinuous resources can be expressed with a plurality of starts/ends;
  Field 3: highest UPDL, as a reference value; and
  Field 4: gain of each SRG relative to the highest UPDL, expressed in dB.

Each field can be expressed by a certain number of bits for multiple values. For example, if two bits are used for Field 1, four types of SRG numbers can be indicated:

| 00 | 1 |
|---|---|
| 01 | 2 |
| 10 | 4 |
| 11 | 8 |

The list of these values can be specified in a protocol. Other fields can be similarly treated.

In some circumstances, the base station can modify the RSRP offset of a user terminal. For example, if the power control function frequently seeks to improve the power density of the transmitter on a SRG to exceed its UPDL due to various reasons, the base station may reduce the RSRP offset of the user terminal, and remove the SRG from the list of SRGs covering the user terminal. As a result, the terminal is switched onto an SRG with a higher UPDL. On the contrary, if the actual transmission power density of a user terminal is much lower than the UPDL of the SRG with the smallest coverage area for a while, the base station can increase the RSRP offset of the user terminal, so as to add an SRG having an even smaller UPDL into the list of SRGs covering the user terminal. As a result, the terminal will be switched to an SRG with a smaller UPDL. In another situation, a user terminal is relatively far from the base station, but has high need for data rate that cannot be satisfied even all the SRGs in the list of SRGs covering it are allocated to it. If this user has a high priority, and the base station decides to allocate more resources to it, the RSRP offset can then be increased, so as to enable the list of SRGs covering the user terminal to have more resources.

While the embodiments of the present invention are described above, the description should not be construed as limitations of the present invention, but merely as embodiments for readily understanding the present invention. Anyone skilled in the art, within the spirit and scope of the present invention, can make amendments or modification to the implementing forms and details of the embodiments. Hence, the scope of the present invention should be subject to the scope defined in the claims.

The invention claimed is:

1. A radio frequency resource reuse method of a radio communication system for supporting radio frequency communications with radio frequency transceivers capable of transmitting and receiving radio frequency signals on different radio frequencies, the radio communication system at least comprising two adjacent cells $C_i$ (i=1, 2), each of the adjacent cells $C_i$ (i=1, 2) referring to a respective geometric area, the two adjacent cells $C_i$ (i=1, 2) using a time-frequency resource for radio frequency communication, the time-frequency resource being denoted as S, the time-frequency resource S being divided into a plurality of resource units, each of the plurality of resource units comprising one time-frequency resource block, wherein a radio frequency transmission power density of each resource unit is configurable separately, the method comprising:
   dividing the time-frequency resource S into N non-overlapping resource groups, denoted as $RG_n$ (n=1, 2, ..., N), N being an integer larger than 1, each of the N non-overlapping resource groups comprising at least two resource units;
   in the two adjacent cells $C_i$ (i=1, 2), dividing the N non-overlapping resource groups $RG_n$ (n=1, 2, ..., N) into first and second non-overlapping portions, the first non-overlapping portion being configured with an upper power density limit (UPDL) $h^{(i)}_n$, the first non-overlapping portion comprising a primary sub-resource group (SRG) of the N non-overlapping resource groups $RG_n$, the second non-overlapping portion being configured with a UPDL $l^{(i)}_n$, the second non-overlapping portion comprising a secondary SRG of the N non-overlapping resource groups $RG_n$, the dividing including defining the first and second non-overlapping portions such that quotients formed by the UDPL $l^{(i)}_n$ of the secondary SRG and the UDPL $h^{(i)}_n$ of the primary SRG, for the series n=1, 2, ..., N are defined by the following relationships: $l^{(i)}_1/h^{(i)}_2 < l^{(i)}_2/h^{(i)}_2 < ... < l^{(i)}_N/h^{(i)}_N \leq 1$, wherein if N=2, then $l^{(i)}_2 \neq h^{(i)}_2$;
   wherein the primary SRGs of the two adjacent cells $C_i$ (i=1, 2) do not overlap with each other in each of the N non-overlapping resource groups $RG_n$.

2. The method according to claim 1, wherein $l^{(i)}_1/h^{(i)}_2 < l^{(i)}_2/h^{(i)}_2 < ... < l^{(i)}_N \leq h^{(i)}_N \leq ... 1h^{(i)}_2 \leq h^{(i)}_1$, (i=1, 2).

3. The method according to claim 2, wherein $l^{(i)}_1 < a^{(i)} < b^{(i)} < h^{(i)}_1$ (i=1, 2), with $a^{(i)}$ and $b^{(i)}$ being any two different UPDLs among $h^{(i)}_n$ and $l^{(i)}_n$, (n=2, 3, ..., N).

4. The method according to claim 2, further comprising the step of:
   determining a coverage area for each SRG in each cell, in such manner that the SRG with a higher UPDL is configured with a larger coverage area.

5. The method according to claim 4, further comprising the steps of:
   transmitting continuously, by a base station, a radio frequency reference signal with a constant power, which is received by a terminal at an intensity recorded as a reference signal at a received power (RSRP); and
   determining an RSRP threshold for each SRG, in such a manner that the SRG with a higher UPDL is configured with a smaller RSRP threshold, while the SRG with a lower UPDL is configured with a larger RSRP threshold.

6. The method according to claim 5, further comprising the steps of:
   measuring the RSRP and reporting to the base station, by the terminal;
   configuring one RSRP offset for the terminal, which is used to modify the RSRP reported by the terminal, to obtain a modified RSRP of the terminal; and
   comparing, by the base station, the modified RSRP of the terminal with the RSRP threshold of each of the SRGs, after which the SRGs having said RSRP thresholds smaller than or equal to the modified RSRP of the terminal are determined to be SRGs covering said terminal, so as to establish a list of SRGs covering the terminal.

7. The method according to claim 6, further comprising the steps of:
   sorting, by the base station, all the SRGs into a sequence in accordance with their respective RSRP thresholds; and
   adding all SRGs with respective RSRP thresholds smaller than or equal to the modified RSRP of the terminal into the list of SRGs covering the terminal.

8. The method according to claim 6, further comprising the steps of:
   periodically measuring the RSRP and reporting to the base station, by the terminal; and
   updating, by the base station, the list of SRGs covering the terminal according to an RSRP measurement report from the terminal.

9. The method according to claim 6, comprising the step of:
   using, by the terminal, the SRGs in the list of SRGs, rather than the SRGs that are not included in the list of SRGs.

10. The method according to claim 6, comprising the steps of:
    establishing, for each terminal participating in resource allocation, a list of SRGs covering the terminal;
    allocating resources, for a user requiring data transmission, first in an SRG that covers the terminal and has the smallest coverage area; then
    allocating, if resources are insufficient, resources in an SRG with the second smallest coverage area, and so on; and
    repeating, if the user acquires required resources, the above steps in connection with a next user, until all users acquire required resources, or until no further resources are available for allocation.

11. The method according to claim 2, wherein at least two primary SRGs in at least one cell of adjacent cells $C_1$ and $C_2$ have consecutive index numbers.

12. The method according to claim 2, further comprising the step of:

broadcasting a power density mask (PDM) uplink information, by the base station, in a cell formed by the base station, for uplink.

13. A base station device, comprising:
memory:
a processor;
(1) a transmitter configured to continuously transmit a reference signal having a constant power;
(2) a receiver configured to receive a reference signal at a received power (RSRP) and an RSRP offset transmitted by a terminal;
(3) a power density mask (PDM) configurator configured to: divide a time-frequency resource S into N non-overlapping resource groups, denoted as $RG_n$ (n=1, 2, ..., N), N being an integer larger than 1, and each of the resource groups including at least two resource units; and divide the N non-overlapping resource groups $RG_n$ (n=1, 2, ..., N) into first and second non-overlapping portions, of which, the first portion is configured with an upper power density limit (UPDL) $h_n$ and termed a primary sub-resource group (SRG) of $RG_n$, and the second portion is configured with a UPDL $l_n$ and termed a secondary SRG of $RG_n$, wherein the primary SRG and the secondary SRG have the following relationships in terms of the UPDLs thereof: $l_1 \le l_2 \le \ldots \le l_N \le h_N \le \ldots \le h_2 \le h_1$, and $1^{(i)}_1/h^{(i)}_1 < 1^{(i)}_2/h^{(i)}_2 < \ldots < 1^{(i)}_N/h^{(i)}_N \le 1$, and if N=2, then $1^{(i)}_2 \ne h^{(i)}_2$;
(4) a coverage threshold generator configured to determine one RSRP threshold for each SRG, in such a manner that the SRG having a higher UPDL is configured with a smaller RSRP threshold, while the SRG having a lower UPDL is configured with a larger RSRP threshold; and
(5) a terminal coverage SRG list generator configured to: modify the RSRP transmitted by each terminal according to the RSRP offset transmitted by said terminal, so as to obtain a modified RSRP; compare the modified RSRP with the RSRP threshold of each of the SRGs; and determine the SRGs with said RSRP thresholds smaller than or equal to the modified RSRP of the terminal to be SRGs covering said terminal, so as to establish a list of SRGs covering the terminal.

14. The base station device according to claim 13, wherein the base station device is used in downlink and further comprises:
a resource allocator configured to: first allocate resources, for a user requiring data transmission, in an SRG which covers the user terminal and has a smallest coverage area, and then allocate resources in an SRG which covers the user terminal and has a second smallest coverage area if resources are insufficient, and so on; and repeat, if said user acquires required resources, said allocating of resources for a next user, until all users acquire required resources, or until no further resources are available for allocation, and
wherein the transmitter is further configured to: transmit resource allocation information determined by the resource allocator to the terminal, schedule resources for user data according to the resource allocation information, transmit user data, and control the transmission power density of a transmitter in each SRG, so as to enable it not to exceed the UPDL of a corresponding SRG.

15. The base station device according to claim 13, wherein the base station device is used in uplink and further comprises:
a resource allocator configured to: first allocate resources, for a user requiring data transmission, in the SRG which covers the terminal and has the smallest coverage area, and then allocate resources in an SRG which covers the terminal and has the second smallest coverage area if resources are insufficient, and so on; and repeat, if said user acquires required resources, said resource allocation for a next user, until all users acquire required resources, or until no further resources are available for allocation, and
wherein the transmitter is further configured to: broadcast information relating to the power density mask in a cell, and transmit resource allocation information determined by the resource allocator to the terminal.

16. A radio communication system, at least comprising two base station devices that form two adjacent cells, each base station device comprising:
memory;
a processor;
(1) a transmitter configured to continuously transmit a reference signal having a constant power;
(2) a receiver configured to receive a reference signal at a received power (RSRP) and a RSRP offset transmitted by a terminal;
(3) a power density mask (PDM) configurator configured to: divide time-frequency resource S into N non-overlapping resource groups, denoted as $RG_n$ (n=1, 2, ..., N), N being an integer larger than 1, each of the N non-overlapping resource groups including at least two resource units; and divide the N non-overlapping resource groups $RG_n$ (n=1, 2, ..., N) into first and second non-overlapping portions, of which, the first non-overlapping portion is configured with an upper power density limit (UPDL) $h_n$ and termed a primary sub-resource group (SRG) of $RG_n$, and the second non-overlapping portion is configured with a UPDL $l_n$ and termed a secondary SRG of $RG_n$, wherein the UPDLs of the primary SRG and the secondary SRG have the following relationships: $l_1 \le l_2 \le \ldots \le l_N \le h_N \le \ldots \le h_2 \le h_1$, and $1^{(i)}_1/h^{(i)}_1 < 1^{(i)}_2/h^{(i)}_2 < \ldots < 1^{(i)}_N/h^{(i)}_N \le 1$, and if N=2, then $1^{(i)}_2 \ne h^{(i)}_2$;
(4) a coverage threshold generator configured to determine one RSRP threshold for each SRG, in such a manner that the SRG having a higher UPDL is configured with a smaller RSRP threshold, while the SRG having a lower UPDL is configured with a larger RSRP threshold; and
(5) a terminal coverage SRG list generator configured to: modify the RSRP transmitted by each terminal according to the RSRP offset transmitted by said terminal, so as to obtain a modified RSRP; compare the modified RSRP with the RSRP threshold of each of the SRGs; and determine the SRGs with RSRP thresholds smaller than or equal to the modified RSRP of the terminal to be SRGs covering said terminal, so as to establish a list of SRGs covering the terminal,
wherein the primary SRGs of the two adjacent cells do not overlap with each other in each of the resource groups.

* * * * *